Dec. 28, 1948.  E. J. RINGER  2,457,728
POWER STEERING MECHANISM AND FOLLOW-UP
CONTROL VALVE THEREFOR
Filed May 28, 1945  3 Sheets-Sheet 1

INVENTOR.
EVUE J. RINGER
BY H. O. Clayton

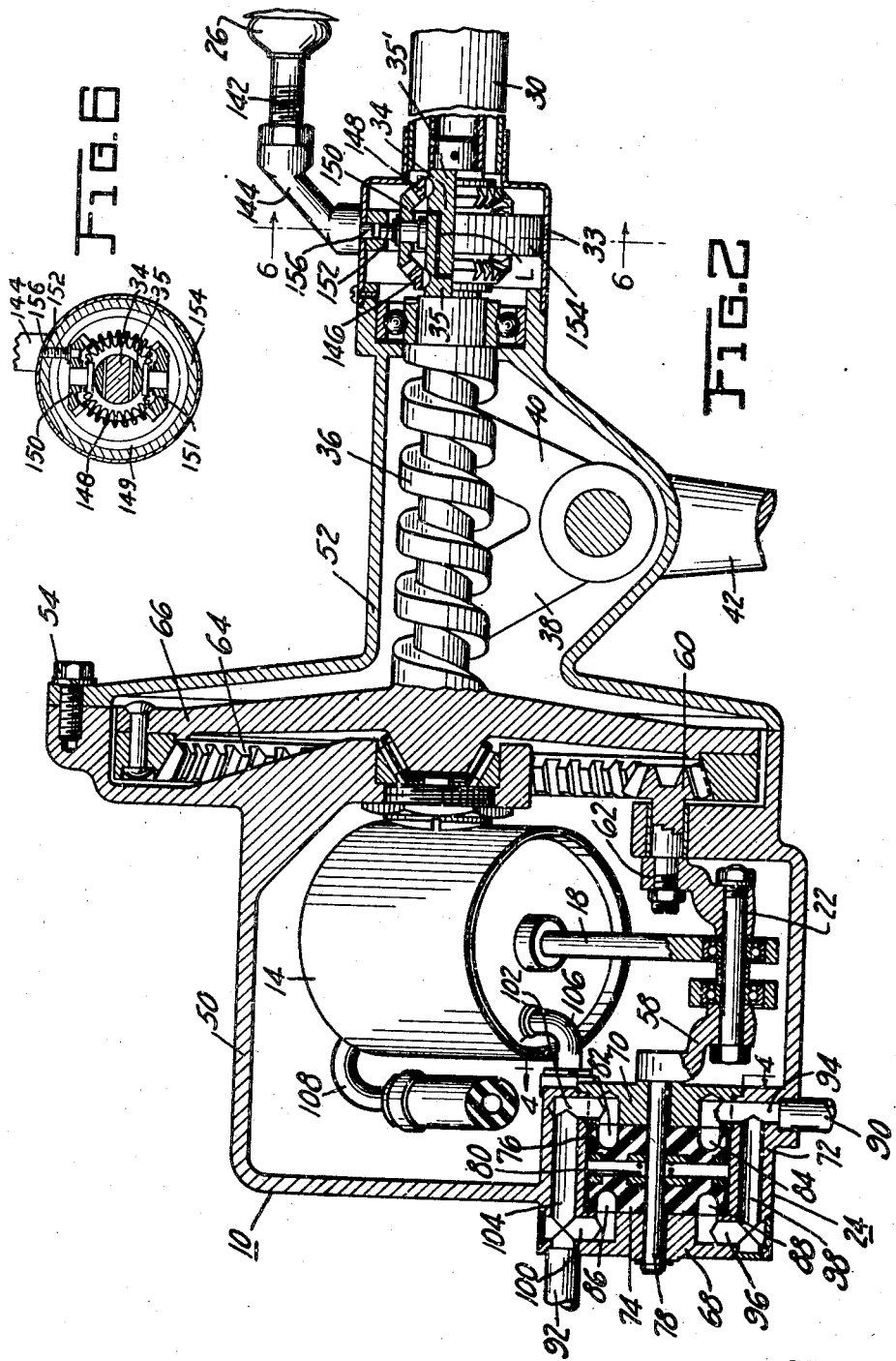

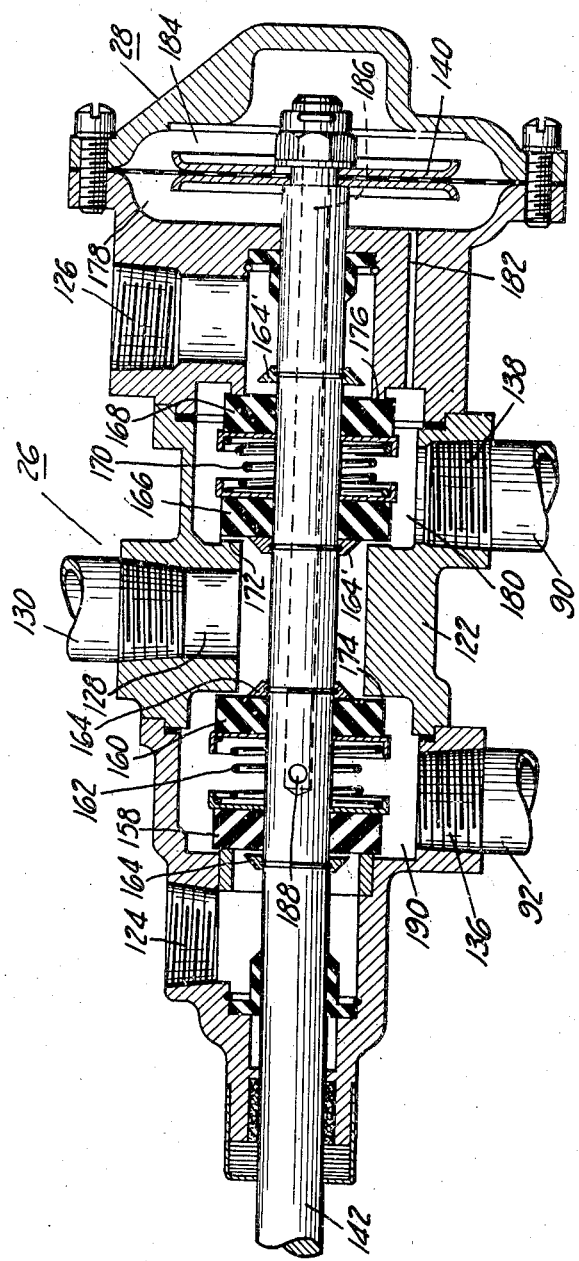

Patented Dec. 28, 1948

2,457,728

UNITED STATES PATENT OFFICE 2,457,728

POWER STEERING MECHANISM AND FOLLOW-UP CONTROL VALVE THEREFOR

Evue J. Ringer, South Bend, Ind., assignor to Bendix Aviation Corporation, South Bend, Ind., a corporation of Delaware Application May 28, 1945, Serial No. 596,309

8 Claims. (Cl. 180—79.2)

This invention relates in general to steering mechanism and in particular to a pressure differential operated power means for operating the steering mechanism of an automotive vehicle.

The principal object of my invention is to provide, in the power plant of an automotive vehicle, an engine consisting of two pressure differential operated motors said engines serving to supplement the physical effort of the driver in the operation of steering the vehicle.

Yet another object of my invention is to provide means, including a plurality of double acting presure differential operated motors, for aiding the driver in the operation of steering an automotive vehicle said motors being controlled in part by a double acting follow-up valve mechanism which may be referred to as a master valve and by a so-called feel mechanism whereby the driver is advised of the degree of force exerted by the power means.

A further object of my invention is to provide a simple and effective power means for supplementing the physical effort of the driver of an automotive vehicle in the operation of steering said vehicle said power means including a multi-motored vacuum engine preferably mounted on the end of the steering column of the vehicle said engine being controlled by a rotary distributor valve and a manually and power operated follow-up master valve operable to initiate the operation of said distributor valve.

A further object of my invention is to provide power means for supplementing the physical effort of the driver in the operation of steering an automotive vehicle said power means including a plurality of concurrently operable pressure differential operated motors controlled by a rotary valve mechanism the operation of said motors being initiated by the operation of a master control valve operated by the driver when he turns the steering wheel.

The principal object of my invention is to provide a simple yet effective combined manually and power operated mechanism for effecting the steering operation of an automotive vehicle, said mechanism being easily serviced and including but a minimum of moving parts.

A further object of my invention is to provide a compact power and manually operated mechanism which may be mounted upon the steering post of an automotive vehicle said mechanism serving to actuate the pitman arm of the steering mechanism of the vehicle.

Other objects and advantages of the invention are referred to in connection with the following detailed description of the accompanying drawings, which represent a preferred embodiment of the invention. After considering this example, skilled persons will understand that many variations may be made without departing from the principles disclosed; and I contemplate the embloyment of any structures, arrangements, or modes of operation that are properly within the scope of the appended claims.

Figure 2 is a view, largely in section, disclosing the principal features of the mechanism constituting my invention;

Figure 5 is a sectional view of the follow-up valve and feel diaphragm unit constituting a part of the control means of my invention; and Figure 6 is a view, taken on the line 6—6 of Figure 2, disclosing details of the valve operating gear mechanism.

Figure 1:
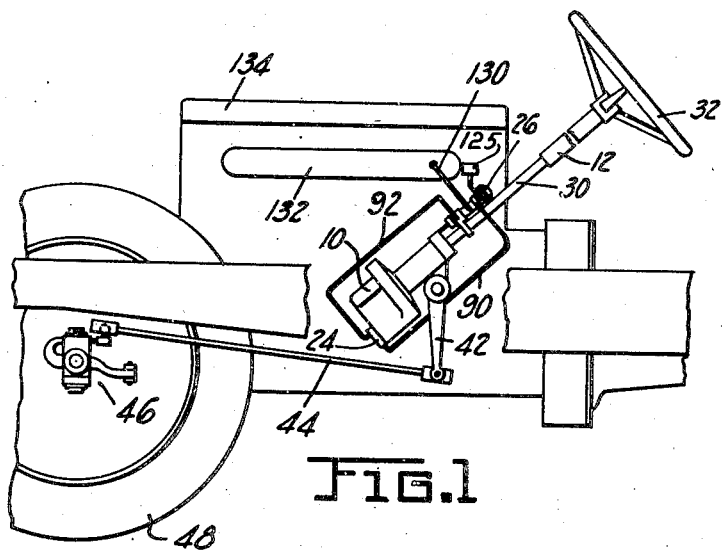
Figure 1 is a diagrammatic view of the combined manually and power operated steering mechanism constituting my invention.

Referring now to Figure 1 disclosing the principal elements of a preferred embodiment of my invention a two motor engine 10 is mounted on the end of the steering column 12. The motors of said unit indicated by the reference numerals 14 and 16 in Figure 3, are operably connected by connecting rods 18 and 20 respectively with a crankshaft 22; and said motors are controlled by a rotary distributor valve unit 24 and a manually and power operated follow-up master valve unit 26 said latter unit including a so-called feel mechanism indicated as a whole by the reference numeral 28, Figure 5.

A hollow steering post 30 is rotated by a steering wheel 32 and to the lower end of the steering column 12 there is secured a casing 33 which houses a two-part valve operating member 34. As disclosed in Figure 2 the two parts 35 and 35' of the member 34 are shaped to mesh with each other there being a certain amount of valve operating lost motion to be taken up before the lower part 35 of said member is rotated by a rotation of the upper part 35' of said member;

and this lost motion is indicated by the letter L. The upper part 35' of the member 34 is drivably connected to the lower end of the steering post 30 and the lower part 35 of the member 34 is drivably connected to the upper end of a worm member 36 which member meshes with pins, not shown, mounted on the ends of crank arms 38 and 40; and the latter members are operably connected to a so-called pitman arm 42 which is in turn connected by a drag link 44 to other parts of the conventional steering mechanism 46 of an automotive vehicle. This steering mechanism serves to rotate the front wheels of the vehicles one of said wheels being indicated by the reference numeral 48.

Figure 3:
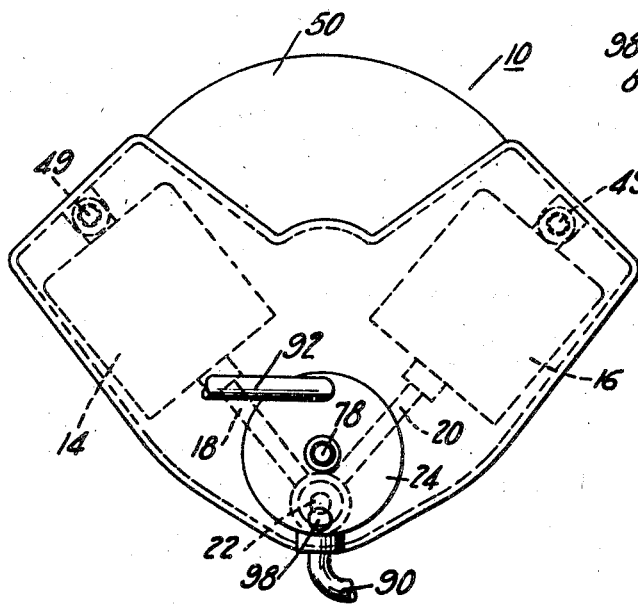
Figure 3 is a front view of the power steering mechanism constituting my invention said view disclosing the two pressure differential operated motors of the so-called vacuum engine of the invention.

As disclosed in Figure 3 the casings of the motors 14 and 16 are pivotally mounted, at 49 and 49' respectively, upon a casing member 50 said casing, as disclosed in Figure 2, being detachably secured to a casing member 52 by fastening members 54. The casing member 52 houses the aforementioned pitman arm operating worm and crank mechanism and to one end of said casing there is secured the aforementioned casing 33 which houses the two-part member 34 and the hereinafter described valve operating mechanism.

As disclosed in Figure 2 the crankshaft 22 is operably connected to the rotary distributor valve 24 by means of a crank 58 and said shaft is operably connected to a driving pinion 60 by means of a crank 62. The pinion 60 meshes with the teeth 64 of a two-part gear member 66 the hub portion of said member being connected to the lower end of the worm member 36.

The rotary valve 24, which serves to concurrently control the energization of the motors 14 and 16 for operation in opposite directions, includes a casing comprising members 68, 70 and 72 said casing housing rotatable valve members 74 and 76 which are preferably keyed to a valve operating shaft 78. As disclosed in Figures 2 and 4 the valve members 74 and 76 which are pressed into contact with the adjacent valve casing members by a spring 80, are both recessed to provide arcuate slots.

Figure 4:
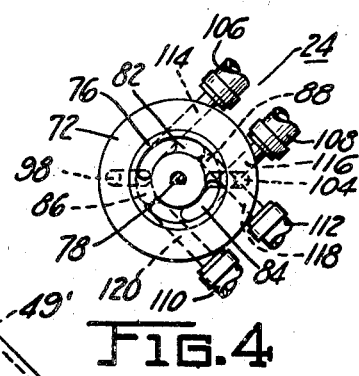
Figure 4 is a sectional view, taken on the line 4—4 of Figure 2, disclosing details of the rotary distributor valve for controlling the operation of the pressure differential operated motors of the mechanism.

As disclosed in Figure 4 the valve member 76 is provided with slots 82 and 84 shown in full lines; and the valve member 74 is provided with slots 86 and 88 shown in dotted lines. To connect these four slots with the follow-up valve 26 there are provided two conduits 90 and 92, Figures 2 and 3, the conduit 90 being connected to a port 94 in the casing member 72 said port being connected, by a duct 98, with a port 96 in the casing member 68. The conduit 92 is connected to a port 100 in the casing member 68; and this port 100 is connected, by a duct 104, with a port 102 in the casing member 70. The four slots 82, 84, 86 and 88 are connected to the double-acting motors 14 and 16 by the four conduits disclosed in Figure 4 and of these conduits those numbered 106 and 108 are connected to opposite ends of the motor 14 and those numbered 110 and 112 are connected to the opposite ends of the motor 16. The valve casing member 72 is provided with a duct 114, Figure 4, serving to interconnect the conduit 106 with one or the other of the slots 82 and 84 depending upon the angular position of the rotatable valve member 76; and the valve casing 72 is provided with a duct 116 serving to interconnect the conduit 108 with one or the other of the slots 82 or 84 depending upon the angular position of said valve member 76. As to the air transmitting connection between the motor 16 and the slots 88 and 86 the conduits 110 and 112 are connected respectively with said slots by ducts 118 and 120 in the valve casing 72.

No claim is made to the follow-up and feel master valve unit 26 disclosed in detail in Figure 5, accordingly, the same will only be briefly described. A hollow casing 122 of said unit is provided with atmospheric ports 124 and 126 preferably connected with air cleaners, one of which is disclosed in Figure 1 and is identified by the reference numeral 125; and said casing is further provided with a vacuum port 128 connected, by a conduit 130, with the intake manifold 132 of an internal combustion engine 134. The casing member 122 is also provided with ports 136 and 138 connected respectively with the aforementioned conduits 92 and 90 leading to the rotary distributor valve 24. One end of the valve casing 122 is shaped to provide one half of the casing of the aforementioned feel motor 28 the power element 140 of said motor being operably connected, by a rod 142 and an angular shaped link 144, with valve operating gearing operably connected to the two-part valve operated member 34.

This valve operating gearing, which is similar in operation to the conventional differential gearing of the passenger car automobile of the day, includes bevel gears 146 and 148 keyed respectively to the parts 35 and 35' of the valve operating member 34; and both of said gears are in mesh with a pinion gear 150 and a pinion gear 151 the gear 150 being provided with a driving pin 152 extending off center from its face and located near its periphery, all as is disclosed in Figure 6. This pin 152 fits within a slot 149 in a ring member 154 said member being provided with an opening to receive a pin 156 mounted in the lower end of the link 144.

Describing the operation of the valve operating gearing mechanism when the steering wheel 32 is rotated, say clockwise, to effect a corresponding rotation of the steering post 30 then the pinion gear 150 is rotated counterclockwise by virtue of the fact that the gear 146 is at the time stationary; and this operation will, by virtue of the bodily movement of the ring 154 effected by the angular movement of the pin 152, effect a valve opening lineal movement of the valve operating rod 142. Now as will be described in greater detail hereinafter this valve opening operation of the steering wheel results in an energization of the vacuum engine 10 and if the driver subsequently arrests the movement of the steering wheel the continued movement of the valve operating member 35 under the action of the engine 10 will result in a reversal of the direction of angular movement of the pinion 150 to reverse the lineal movement of the rod 142 thereby effecting a lapping operation of the valve unit 26.

Continuing the description of the parts of the control unit 26, Figure 5, valve members 158 and 160, mounted on the rod 142, are biased to the left and right respectively by a spring 162 said spring forcing said valve members toward stops 164. Valve members 166 and 168 are likewise biased, by a spring 170, against stops 164'.

Now the parts of the above described mechanism are so constructed and arranged that when the internal combustion engine 134 is dead, the front wheels are positioned in their straight ahead position, and the driver has removed his hands from the steering wheel, then the parts of the mechanism assume the position disclosed in the several figures of the drawing; and referring to the unit 26 in particular it is to be noted that at this time the valve members 158, 160, 166 and 168 are positioned to connect both conduits 90 and 92 with the intake manifold, that is the source of vacuum power. It is apparent therefore that the motors 14 and 16 are what is known in the art as vacuum suspended motors, that is both ends of both of said motors are connected to the source of vacuum when said motors are deenergized.

Describing the operation of the combined power and manually operated steering mechanism constituting my invention it will be assumed that the engine is idling and this being true both ends of the motors 14 and 16, will, by virtue of their connections with the intake manifold, be partially evacuated. To effect a right turn operation of the mechanism the driver rotates the steering wheel 32 clockwise and this operation results, by virtue of the lost motion at L and the operation of the gears 150 and 151 and ring 154, in a lineal movement of the rod 142 to the left, Figure 5. This operation results in an expansion of the spring 170 to effect a seating of the valve member 166 upon a valve seat 172 and a concurrent compression of the spring 162 to increase the spacing of the valve member 160 from a seat 174; and this leftward movement of the rod 142 then results in the valve member 168 being moved off of a valve seat 176. The latter operation vents a compartment 178 of the so-called feel motor 28 to the atmosphere via the port 126 connected with an air cleaner, Figure 1, a valve compartment 180 and a duct 182 in the valve casing 122. Now a chamber 184 of the motor 28 is at this time connected to the intake manifold via a duct 186 extending through the rod 142 and opening 188 in said rod, a valve compartment 190, the interior of the valve casing 122, the valve port 128 and the conduit 130.

It follows therefore that when the driver rotates the steering wheel to effect a right turn operation of the steering mechanism that immediately after the valve 26 is opened the feel motor 28, by virtue of the differential of pressures acting upon its power element 140, functions to resist said turning movement of the steering wheel. Now this resistance to movement of the steering wheel is known in the art as feel and, as will be made apparent from the description to follow, the degree of this resistance is directly proportional to the degree of energization of the motors 14 and 16.

Continuing the description of the operation of the mechanism of my invention when the valve member 168 is unseated, that is when the master valve 26 is opened as described above, then an operation of the distributor valve 24 is initiated. Explaining the latter operation the lower end of the motor 14 is vented to the atmosphere via port 126, compartment 180, conduit 90, port 94 and slot 82 in the valve 24, and conduit 106 only a portion of which is shown in Figure 2. The upper end of the motor 16, that is that end farthest away from the crankshaft 22, is at the same time vented to the atmosphere via conduit 90, the passages 94, 98 and 96 in the valve 24, slot 86 and the duct 120 in said valve, and conduit 110. The upper end of the motor 14 and the lower end of the motor 16 are at this time connected with the intake manifold, the connection with the upper end of the motor 14 including the conduit 130, the interior of the valve casing, the valve compartment 190, conduit 82, ducts 104 and 102 in the valve 24, slot 84 and duct 116 in said valve and the conduit 108; and the connection between the lower end of the motor 16 and the intake manifold including the conduit 92, the duct 100, the slot 88 and the duct 118 in the valve 24, and the conduit 112.

It is apparent therefore that with the aforementioned opening of the master valve 26 there results a simultaneous or substantially simultaneous energization of both of the vacuum suspended motors 14 and 16 the power elements thereof being subjected to a force which results in a rotation of the crank 22; and the operation of said crank results, through the intermediary of the above described gearing 60, 64, pitman arm 42 and other force transmitting means, in the desired right turn operation of the vehicle steering wheels. As to the operation of the vacuum engine 10 the parts of said engine, including the motors 14 and 16 and the slots of the rotary control valve 24, are so constructed and arranged that the operation of said motors is continuous once the operation is initiated by an opening of the valve 26. In other words the operation of the valve 24, particularly as a result of the arrangement of the slots 82, 84, 86 and 88 is such that the direction of operation of the motors 14 and 16 is reversed at the proper time.

Now the above described operation of the steering mechanism is effected immediately after the valve 26 is opened, that is after the rod 142 is moved to unseat the valve member 168; however as explained above it is to be noted that to maintain this operation the driver must continue the rotation of the steering wheel to keep said valve open; and in doing so he will probably exert sufficient physical force to aid the motors 14 and 16 in their operation of the mechanism. Explaining this operation it is to be remembered that after the lost motion at L is taken up by the above described valve cracking operation then continued movement of the steering wheel will result in the power operation of the steering mechanism being aided by the physical effort of the driver; and it is also to be noted that if the power means fails then the steering operation is effected solely by the physical effort of the driver. Explaining the latter operation the cluster of gears 146, 148, 150 and 151 bodily move as a unit there being no angular movement of said gears; and in this operation the pin 152 slides within the slot in the ring 154 said ring being at the time stationary.

Explaining now the follow-up and feel operation of the steering mechanism of my invention if during the above discussed right turn steering operation the driver should arrest the movement of the steering wheel immediately after the valve 26 is cracked then the resulting rotation of the worm member 36 by the operation of the motors 14 and 16 results in a reversal of the direction of movement of the rod 142 to lap the valve and maintain the then existing energization of said motors. Describing the lapping operation of the valve 26 the reversal of movement of the rod 142 results in an expansion of the spring member 170 to seat the valve member 168 thereby cutting off the flow of air into the chamber 178 of the feel motor 28 and into the motors 14 and 16. If this follow-up operation of the valve 26 is repeated, for example when the driver is slowly moving the steering wheel when parking the car or moving the front wheels when the vehicle is mired in the mud, then the degree of gaseous pressure in the control chambers of the motors 14, 16 and 28 is increased and the driver is, by the operation of the feel motor 28, advised of the degree of power loading being then effected by the vacuum engine 10.

As to a left turn steering operation of the mechanism of my invention this operation is just the reverse of the right turn operation just described, accordingly, said left turn operation will not be described in detail. Suffice it to say that when the steering wheel is turned counterclockwise the valve member 158 of the valve 26 is unseated thereby initiating the operation of the vacuum engine 10 to aid the driver in effecting the left turn operation of the steering wheels; and an inspection of Figures 2 and 5 will make it apparent that the above described follow-up to lap and feel operation of the control mechanism will be effected during this left turn operation.

There is thus provided, by the mechanism of my invention a compact and efficient manually and power operated steering mechanism well adapted to be incorporated in a conventional automotive steering mechanism of the day.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the forms hereinbefore described being merely a preferred embodiment thereof.

I claim:

1. In an automotive vehicle provided with a steering mechanism including a pitman arm, a steering wheel and a steering column; power and manually operated means for effecting either a power operation of the steering mechanism or a manual operation of said mechanism in the event of failure to effect a power operation of the mechanism, or a combined power and manual operation of said mechanism; said power and manually operated means including a multi-motored vacuum engine a rotary valve for controlling the operation of said engine by providing fluid passages in communication with the respective motors of said engine, a manually and power operated follow-up to lap valve for both initiating and cutting off the flow of pressure fluid to and from the aforementioned rotary control valve whereby to effect an operation of the multi-motored engine; and force transmitting means, interconnecting the steering wheel, the multi-motored engine, the pitman arm and the follow-up to lap valve.

2. Mechanism for actuating the pitman arm of the steering mechanism of an automotive vehicle said actuating mechanism comprising a multi-motored vacuum engine mounted on the lower end of the steering column of the steering mechanism, a rotary distributor valve for controlling the operation of said engine by providing fluid passages in communication with the respective motors of said engine, a master follow-up to lap valve for initiating and cutting off the flow of pressure fluid to and from the distributor valve whereby to effect an operation of the multi-motored engine, force transmitting means, including a rod, for operating said follow-up to lap valve, force transmitting means interconnecting the steering wheel of the vehicle with the aforementioned force transmitting means, and other force transmitting means, including a member cooperating with a part of the second mentioned force transmitting means to provide a lost motion connection, interconnecting the pitman arm, the power elements of the engine motors and the first mentioned force transmitting means whereby there is provided power means, the operation of which is initiated and cut off by an operation of the follow-up valve, for supplementing the manual effort of the driver in effecting a steering operation of the pitman arm.

3. Mechanism for actuating the pitman arm of the steering mechanism of an automotive vehicle said actuating mechanism comprising a multi-motored vacuum engine mounted on the lower end of the steering column of the steering mechanism, a rotary two-part distributor valve for controlling the operation of said engine said valve being operably connected to the power elements of the motors of said engine, a master follow-up to lap valve for initiating and cutting off the flow of fluid pressure to and from the distributor valve whereby to effect an operation of the multi-motored engine said follow-up valve being also mounted on the vehicle steering column, force transmitting means, including a rod, for operating said follow-up to lap valve, force transmitting means interconnecting the steering wheel of the vehicle with the aforementioned force transmitting means, and other force transmitting means, including a member cooperating with a part of the second mentioned force transmitting means to provide a lost motion connection, interconnecting the pitman arm, the power elements of the engine motors and the first mentioned force transmitting means whereby there is provided a steering column mounted power means, the operation of which is initiated and cut off by an operation of the follow-up valve, for supplementing the manual effort of the driver in effecting a steering operation of the pitman arm.

4. In an automotive vehicle provided with a steering mechanism including a pitman arm, a steering wheel and a steering column; power and manually operated means for effecting a power operation of the steering mechanism or a manual operation of said mechanism in the event of a failure to effect a power operation of the mechanism, or a combined power and manual operation of said steering mechanism; said power and manually operated means including a multi-motored vacuum engine mounted on the steering column, a rotary valve, actuated by the power elements of the engine by providing fluid passages in communication with the respective motors of said engine, for controlling the operation of said engine, a manually and power operated follow-up to lap valve, including a casing member and a reciprocable valve operated rod extending within said casing member, for both initiating and cutting off the flow of pressure fluid to and from the aforementioned rotary control valve whereby to effect an operation of the multi-motored engine; and force transmitting means, including a lost motion connection operable to make possible the lapping operation of the follow-up to lap valve, interconnecting the steering wheel, the pitman arm, the multi-motored engine, and the follow-up to lap valve.

5. In an automotive vehicle provided with a steering mechanism including a pitman arm, a steering wheel and a steering column; power and manually operated means for effecting either a power operation of the steering mechanism or a manual operation of said mechanism in the event of failure to effect a power operation of the mechanism, or a combined power and manual operation of said mechanism; said power and manually operated means including a multi-motored vacuum engine mounted on the steering column, a two part rotary valve, actuated by the power elements of the several motors of the vacuum engine, for controlling the operation of said engine by providing fluid passages in communication with the respective motors of said engine, a follow-up to lap valve for initiating and cutting off the flow of pressure fluid to and from the rotary valve whereby to effect an operation of the multi-motored engine, fluid transmitting means interconnecting the two aforementioned valves, and force transmitting means, including lost motion means, interconnecting the steering wheel, the pitman arm, the engine and the follow-up to lap valve.

6. In an automotive vehicle provided with a steering mechanism including a pitman arm, a steering wheel and a steering column; power and manually operated means for effecting either a power operation of the steering mechanism or a manual operation of said mechanim in the event of a failure to effect a power operation of the mechanism, or a combined power and manual operation of said mechanism; said power and manually operated means including a multi-motored vacuum engine mounted on the steering column, a two-part rotary valve, actuated by the power elements of the several motors of the vacuum engine, for controlling the operation of said engine by providing fluid passages in communication with the respective motors of said engine, a follow-up to lap valve for initiating and cutting off the flow of pressure fluid to and from the rotary valve whereby to effect an operation of the multi-motored engine, means, mounted on the follow-up to lap valve, for advising the driver, as he actuates the steering wheel, of the degree of force being exerted by the vacuum engine, fluid transmitting means interconnecting the two aforementioned valves, and force transmitting means, including a lost motion means, interconnecting the steering wheel, the pitman arm, the vacuum engine and the follow-up to lap valve.

7. In an automotive vehicle provided with a steering mechanism including a pitman arm, a steering wheel and a steering column; power and manually operated means for effecting either a power operation of the steering mechanism or a manual operation of said mechanism in the event of a failure to effect a power operation of the mechanism, or a combined power and manual operation of the mechanism; said power and manually operated means including a multi-motored vacuum engine, a rotary distributor valve for controlling the operation of said engine by providing fluid passages in communication with the respective motors of said engine, a manually and power operated follow-up to lap valve for initiating and cutting off the flow of pressure fluid to and from the distributor valve, and force transmitting means interconnecting the power elements of the motors of the vacuum engine, the pitman arm, the steering wheel and the follow-up to lap valve, said force transmitting means including a force transmitting element connected to the pitman arm and power elements of the motors of the vacuum engine, a force transmitting element connected to the steering wheel and having a lost motion connection with the aforementioned element, said force transmitting means further including a nest of gears interconnecting the follow-up to lap valve with said aforementioned two force transmitting elements.

8. In an automotive vehicle provided with a steering mechanism including a pitman arm, a steering wheel and a steering column; power and manually operated means for effecting either a power operation of the steering mechanism or a manual operation of said mechanism in the event of failure to effect a power operation of the mechanism, or a combined power and manual operation of the mechanism; said power and manually operated means including a multi-motored vacuum engine, a rotary distributor valve for controlling the operation of said engine by providing fluid passages in communication with the respective motors of said engine, a manually and power operated follow-up valve, including a casing and a reciprocable valve operated rod extending within the casing, for initiating and cutting off the flow of pressure fluid to and from the distributor valve, and force transmitting means interconnecting the power elements of the motors of the vacuum engine, the pitman arm, the steering wheel and the follow-up valve, said force transmitting means including a force transmitting element connected to the pitman arm and to the power elements of the motors of the vacuum engine, a force transmitting element connected to the steering wheel said latter element having a lost motion connection with the aforementioned force transmitting element, said force transmitting means further including a nest of gears interconnecting the follow-up valve with said aforementioned two force transmitting elements.

EVUE J. RINGER.

REFERENCES CITED

The following references are of record in the file of this patent:

UNITED STATES PATENTS

| Number | Name | Date |
|---|---|---|
| 1,910,600 | Fitch | May 23, 1933 |
| 2,077,747 | Edmondson | Apr. 20, 1937 |
| 2,213,271 | Davis | Sept. 3, 1940 |
| 2,313,704 | Hey | Mar. 9, 1943 |